US007587277B1

(12) United States Patent
Wells

(10) Patent No.: US 7,587,277 B1
(45) Date of Patent: Sep. 8, 2009

(54) INERTIAL/MAGNETIC MEASUREMENT DEVICE

(75) Inventor: Randy Wells, Huntsville, AL (US)

(73) Assignee: Miltec Corporation, Huntsville, AL (US)

( * ) Notice: Subject to any disclaimer, the term of this patent is extended or adjusted under 35 U.S.C. 154(b) by 441 days.

(21) Appl. No.: 11/285,644

(22) Filed: Nov. 21, 2005

(51) Int. Cl.
  *G01C 21/00* (2006.01)
(52) U.S. Cl. ..................................... 701/220
(58) Field of Classification Search ................. 701/200, 701/220; 73/178 R; 342/357.14
  See application file for complete search history.

(56) References Cited

U.S. PATENT DOCUMENTS

| 6,361,507 | B1 | 3/2002 | Foxlin |
| 6,496,779 | B1 | 12/2002 | Hwang |
| 6,516,283 | B2 | 2/2003 | McCall et al. |
| 6,522,992 | B1 | 2/2003 | McCall et al. |
| 6,882,964 | B2 | 4/2005 | Bayard et al. |
| 6,955,082 | B2 * | 10/2005 | Adebjork et al. ............. 73/181 |
| 7,341,221 | B1 | 3/2008 | Wilson |
| 2007/0032951 | A1 * | 2/2007 | Tanenhaus et al. .......... 701/220 |

OTHER PUBLICATIONS

DFOISR #04-s-0689, "Proposed IEEE Inertial Systems Terminology Standard and Other Inertial Sensor Standards" by Randall K. Curey et al., pp. 1-9, undated.

Printout dated Sep. 13, 2005 from web page from www.sensorsmag.com Sensors Magazine Online, Sep. 2003, Sensors Online, Sensor Technology and Design, entitled "A Unique Angular-Rate-Sensing Gyro" pp. 1-5, dated Sep. 2003.
Printout dated Sep. 13, 2005 from web page from www.sensorsmag.com Sensors Magazine Online, Aug. 2002 Putting Sensors to Work entitled "MEMS Sensors in Virtual Reality" pp. 1-7, dated Aug. 2002.
"An Inertial Measurement Framework for Gesture Recognition and Applications" by Ari Y. Benbasat et al, pp. 9-20, dated 2002.
IMU-E604 Manual, Revision G. entitled "Inertial Measurement Unit, Owner's Manual Part No. IMU-E604" pp. 1-32, dated Oct. 22, 2000.
Printout dated Sep. 13, 2005 from web page from www.gpsworld.com GPS World—From View to Kill, entitled "Integrated System Guides Ballistic Missile Intercept", pp. 1-5, dated May 1, 2003.
Inertial Science, Inc. entitled Inertial Measurement Unit (IMU) ISIS-IMU (Rev. C), Application Control #Z271590, undated.

* cited by examiner

*Primary Examiner*—Yonel Beaulieu
(74) *Attorney, Agent, or Firm*—Lathrop & Gage LLP

(57) ABSTRACT

Disclosed is a system and method for onboard optimal estimation of heading, pitch, and roll through real-time measurement of magnetic field, acceleration and angular motion in three dimensions. Magnetometer information is used to create an initial reference from which movement is measured. Thus, the process does not have to start when the body is in a known position. Further, the device does not have to continually rely on accelerometer data to get roll and pitch. To do this magnetic field data is used to complement gyro information. The magnetic data is used to estimate pitch, roll, and heading.

25 Claims, 5 Drawing Sheets

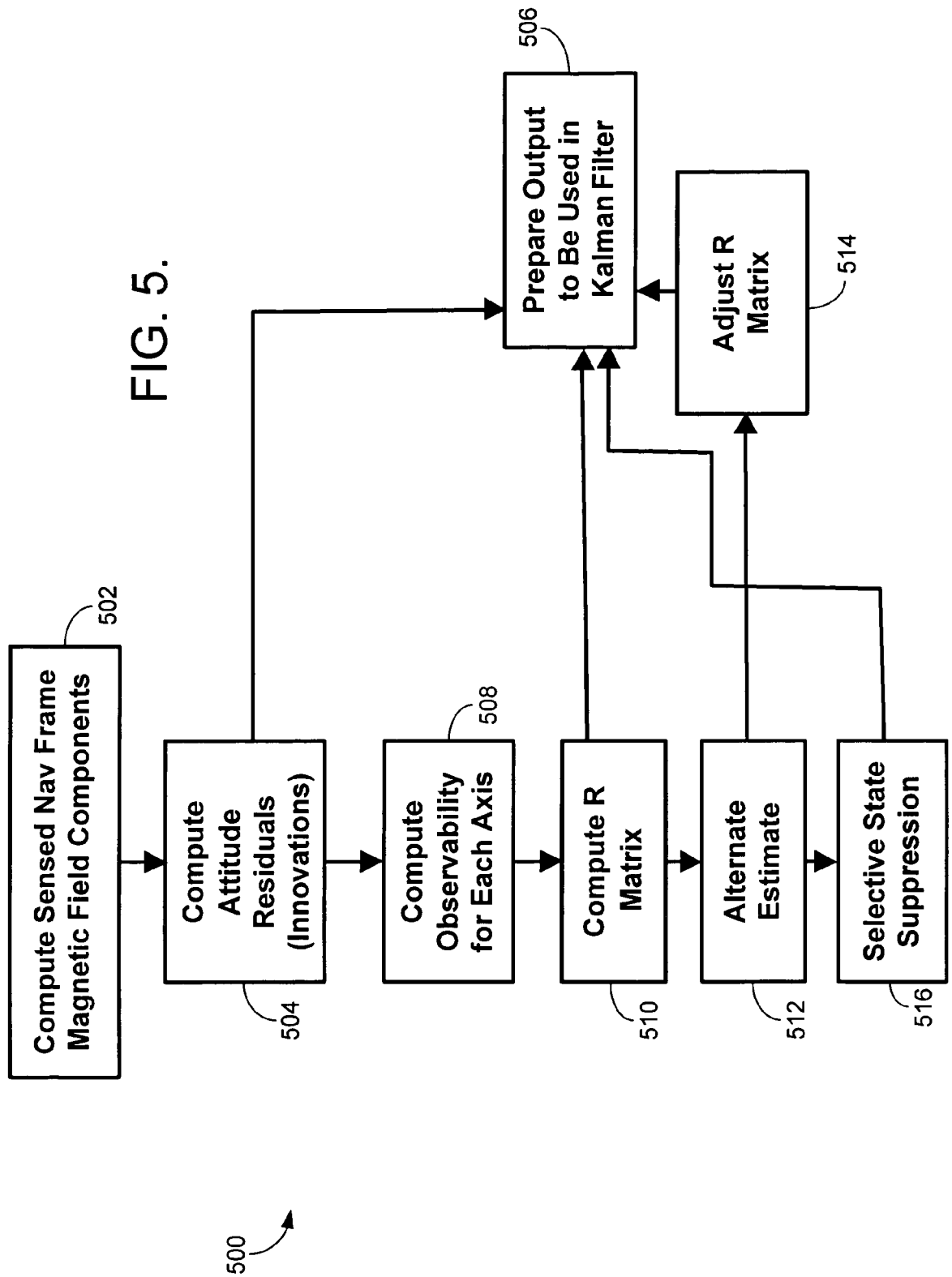

INERTIAL/MAGNETIC MEASUREMENT DEVICE

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The invention relates to the measurement of linear and angular motion with magnetic field in three dimensions. More specifically, the invention relates to the use of inertial/magnetic measurement devices in highly dynamic environments without the necessity of known location and local geomagnetic field for applications that only need angular position of one component relative to another (e.g., fire arm night scope relative to night vision goggles) while providing magnetically aided attitude (angular orientation) output.

2. Description of the Related Art

An inertial measurement unit (IMU) is a single device which is associated with a vehicle or other body. The device collects a combination of angular and linear acceleration data which is then sent to a processor. Two kinds of groups of sensors are typically included in the devices housing. The first group is an accelerometer triad. An accelerometer triad measures translational values using three sensors—each of which generates a separate analog signal representing a raw measured acceleration in one of the three dimensions. The second group of sensors includes three angular rate sensors (gyros) which each measure the angular velocity (rate) in one of the three dimensions.

A heading and attitude reference system (AHRS) is a single device which includes an IMU for inertial measurements and a microprocessor with embedded software to gather the IMU data and refine it to produce accurate measurements of heading, pitch, and roll angles with respect to a given local reference frame.

Some IMUs contain an accelerometer triad, a gyro triad and a magnetometer triad. In these devices the magnetic field measured by the magnetometers is blended with the data from the gyros and accelerometers to produce an AHRS.

Maintaining accuracy is a goal common to all modern-day IMU's and AHRS's. All IMU's experience noise-related errors from the accelerometers and gyros. The initial error caused by the drift and noise can be quite small. Other errors include turn-on residual bias, scale factor (SF), g-sensitive gyro bias, and angular random walk. When these errors are incorporated into integrated real time data over a period of time, however, accuracy can degrade significantly.

A first step in combating drift is using calibration and initialization techniques. Sensor bias, e.g., can be calibrated using factory settings for a strap-down IMU. For other IMUs, the earth's gravity field is used to calibrate and recalibrate sensor biases, scale factors, and other troubled parameters.

Onboard (or operational) calibration requires that known valid inputs be provided for the estimation of parameters. This is simple when angular rate and acceleration values are known, e.g., when the body is at rest. However, when new information is mixed with earlier information in a real time status, e.g., when the body is and has been in motion, Kalman filtering has been used to dynamically estimate (or calibrate) such parameters.

Kalman filter-aided systems use recursive data to estimate the real time state of the body using the noisy and biased data received from the inertial/magnetic measurement device sensors along with measurements of parameters that are related to the parameters (states) being estimated by the Kalman filter. In other words, previous data is used along with noisy new readings to formulate a more accurate estimation of the current states. Bias errors as well as the navigational states (e.g., position, velocity, and attitude) are initially defined. These initial states and their covariances are propagated out using covariance matrices to estimate the accuracy of the current readings.

In a prior art publication, U.S. Pat. No. 6,522,992 issued to McCall et al., magnetometer data is output to an attitude and heading module to be combined with gyro heading data. McCall does not disclose, however, the manner in which the magnetic data is used. Typically, this has been accomplished as follows: The magnetometer provides signal readings in all three dimensions proportional to the measured magnetic field vector. Pitch and roll data are then received from the attitude and heading module to form a transformation matrix from the body frame to a horizontal frame. Magnetic heading data is then calculated using the measurement vector expressed in the horizontal frame. This data is then output to the attitude and heading module so that it may be considered in the calculation of heading data along with the gyro-generated heading data. The heading estimations, however, depend upon roll and pitch values derived from sensed acceleration. The limitation of this approach to magnetic heading derivation is that roll and pitch estimation is highly dependent on "stillness" of the vehicle as well as the requirement of a gravity-only environment. In "non-still" environments, disturbances caused by non-gravitational forces on the vehicle, can significantly corrupt the roll and pitch estimation accuracy. In pure ballistic (free-fall) environments, gravitational acceleration is unobservable.

Thus, there is a need in the art for an IMU (or AHRS) which more effectively uses the earth's magnetic field in mitigating gyro drift and other inertial measurement errors.

SUMMARY OF THE INVENTION

One objective of the present invention is to provide an IMU which uses computer-readable media to measure direction and/or motion. The media has computer-usable instructions embodied thereon for accomplishing a magnetic-aided prefilter process. This process includes the steps of computing a body-sensed navigational frame magnetic field vector using sensed magnetic data, calculating attitude residuals between the body-sensed navigational frame magnetic field components and an initial magnetic reference frame, and outputting the residuals to a Kalman filter process. The prefilter process also includes the steps of measuring the observability for an attitude axis for each of roll, pitch, and yaw, and producing a measurement-noise covariance matrix. The covariance matrix is used in the Kalman process for estimating purposes.

It is a further objective of the present invention to include a magnetic anomaly filtering process. This process identifies whether an anomaly exists in magnetometer data and notifies other processes of the existence of an anomaly if one exists. If an anomaly exists, other processes are notified of such. Further, the anomaly is able to be estimated and removed.

Yet another objective is the provision of a navigational frame initialization process which provides an initial three-dimensional coordinate frame of reference from which the sensed magnetic field will be transformed.

A further objective is the inclusion of an intermittent gyro calibration module which assists in the calibration of gyro data.

BRIEF DESCRIPTION OF THE SEVERAL VIEWS OF THE DRAWINGS

The present invention is described in detail below with reference to the attached drawing figures, wherein:

FIG. 5 is a process flow diagram showing the steps in a magnetic aiding prefilter process module of one embodiment of the present invention.

DETAILED DESCRIPTION OF THE INVENTION

Figure 1:
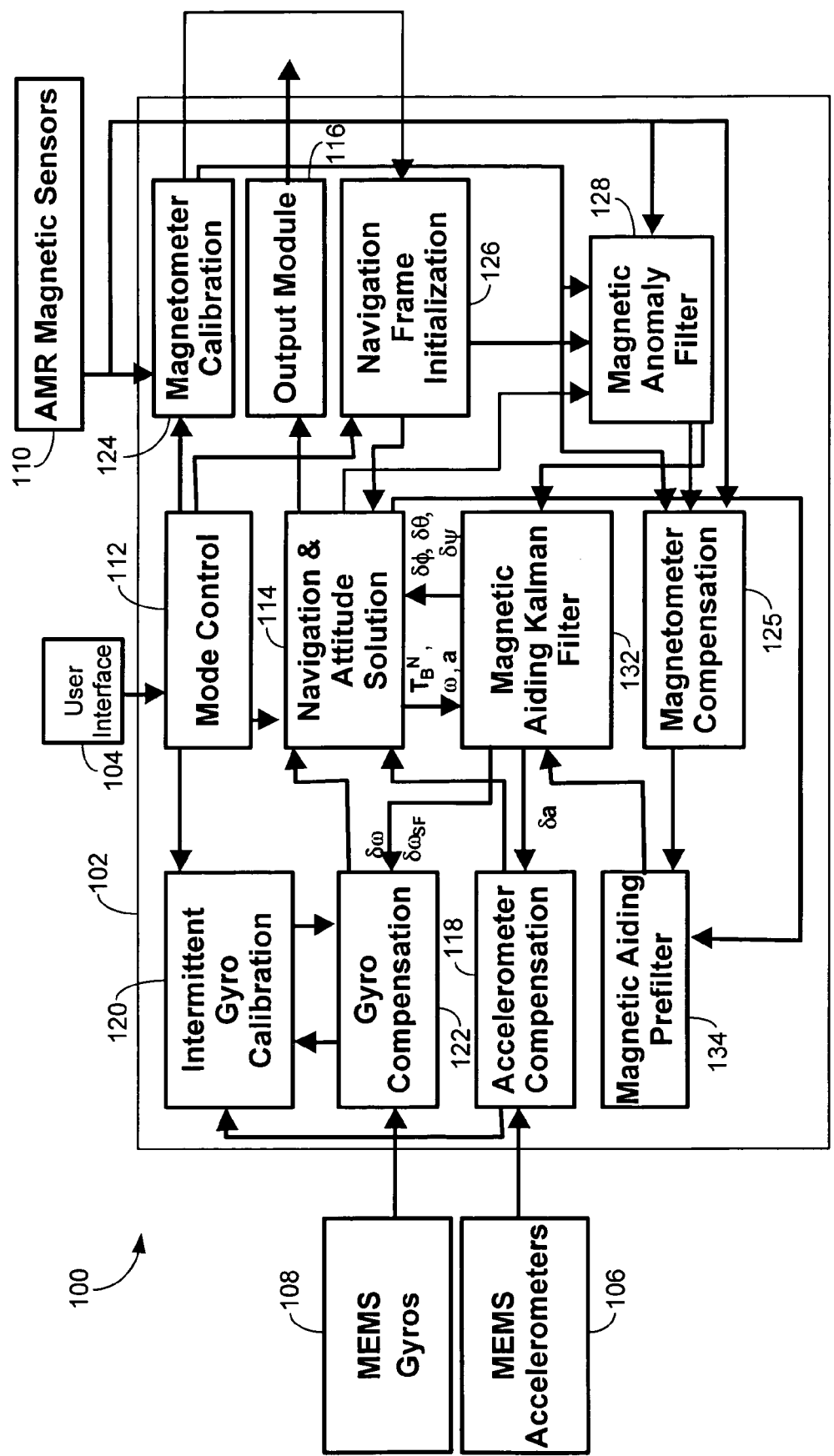
FIG. 1 is a schematic/process flow diagram showing one embodiment of the system of the present invention and one embodiment for an environment in which the processes of the present invention may be executed.

The present invention provides a system and method for onboard optimal estimation of heading, pitch, and roll through real-time measurement of magnetic field, acceleration and angular motion in three dimensions. More specifically, the invention relates to the use of magnetically-aided IMU's (i.e., inertial/magnetic measurement units) in dynamic environments.

The process uses the earth's magnetic field and inertial measurements to provide accurate onboard estimates of heading, pitch, and roll. This improves the prior art systems where only heading error is bound by magnetic aiding. Thus, a device used according to these processes does not have to continually rely on accelerometer data to get roll and pitch (only in remote instances in which either roll or pitch are magnetically unobservable for long periods).

Further, initialization of this system does not necessarily require prior or stored information of the local earth magnetic field (e.g., a geomagnetic map). This improved system instead captures the magnetic field by measurement during the initialization process and then uses this measurement as the reference throughout operation. This assumes that operation is maintained within the bounds of an area in which the earth's magnetic field remains substantially constant. As one skilled in the art will recognize, a significant change in the earth's magnetic field will not be recognized over large distances. Because of this, the geographic area in which accuracy is able to be maintained is very great.

This invention also includes a module designed to detect and compensate for dynamic anomalies, or disturbances, caused by nearby magnetic sources such as ferromagnetic material or electric motors.

Some example uses for the inertial/magnetic measurement device of the present invention are in (i) micro-satellites, (ii) small arms, (iii) unmanned ground vehicles, (iv) unmanned air vehicles, (v) gun launched munitions, (vi) missiles, (vii) small passenger aircraft, (viii) robots, (ix) oil drill downhole arrangements, (x) virtual reality devices, (xi), sounding rockets, as well as numerous other bodies in motion.

Various technical terms are used throughout this description. These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a real-time embedded software product that works in combination with physical system components.

Computer-readable media of this software include both volatile and nonvolatile media, removable and nonremovable media, and contemplates media readable by a database, a switch, and various other devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Exemplary embodiments of the present invention are disclosed in FIGS. 1 through 5. Referring first to FIG. 1, a schematic diagram of an inertial/magnetic measurement device 100 for one embodiment of the system of the present invention is shown. This schematic also includes process information regarding device 100.

In terms of physical components, device 100 comprises a processor 102, a user interface 104, a MEMs accelerometer triad 106, a MEMs gyro triad 108, and a plurality of anisotropic magnetoresistance (AMR) sensors 110. A plurality of processes are also shown running on processor 102 in FIG. 1.

User interface 104, in the preferred embodiment, is a simple user control button arrangement. These kinds of arrangements and the ways in which they are able to interface with processing devices, e.g., microprocessors such as processor 102 are well known in the art. Other means for interfacing with processors, however, are known in the art, and would fall within the scope of the present invention. Interface 104 could alternatively be some sort of automated client which is either wired with and travels with the body, or communicates remotely (through some wireless arrangement) with the body to accomplish control. Interface 104 could also be a digital serial bus, along with power cable (for missile launch applications)

MEMs (Micro-Electronic-Mechanical Systems) accelerometers and gyros have only recently (within the last several years) become developed to the point that they are useable with inertial measurement instruments. Despite their small size and light weight, these devices have proved to be reliable and inexpensive. This makes them adaptable for applications which before would have been too expensive or otherwise unworkable—for example, consumer electronics, gun-launched munitions, and small arms for the military.

The MEMs accelerometer sensor triad 106 is arranged such that it will measure translational movement (acceleration) and location of a body in three dimensions. In addition to translational movement, MEMs gyro sensor triad 108 is arranged such that it will measure angular rate in three angular dimensions as well as attitude.

Anisotropic magnetoresistive (AMR) magnetic sensors like those used in plurality 110 have been used in digital compass devices. Here, they are incorporated into the inertial/magnetic measurement device such that they measure magnetic field in three dimensional space. This field is represented by a three dimensional vector. The AMR magnetic sensors detect not only the magnitude, but also the orientation of the magnetic field, which, absent some anomaly (e.g., alternative sources of magnetism) will not change over time.

These kinds of sensor arrangements involving combinations of accelerometer, gyro, and magnetometer triads—are known to some of those skilled in the art. Further, one skilled in the art will know how to aggregate all three sensor groups—the accelerometers, gyros, and magnetometers, such that processor 102 can receive readings from them and then process that data. The readings of the accelerometer, gyro, and magnetic sensors are all taken and initially transmitted in analog. The analog signal is converted to digital and then recognized by processor 102 in a manner known in the art.

Though magnetometers have been used in inertial measurement units before, the system of the present invention uses the magnetic information in a different way. The prior art methods use accelerometer data similarly to that of a tilt sensor arrangement. In this kind of arrangement, the accelerometer measurements are used to derive roll and pitch. This is typically followed by an algorithm (which is similar to those used with the conventional digital compass devices) to transform the magnetic measurements into the horizontal plane. This intermediate angle is then compared to a local magnetic heading retrieved from a stored standard magnetic reference map or from an onboard earth magnetic field model. Both approaches require user position information (e.g., latitude and longitude). Heading reference to North is then accomplished by differencing the intermediate heading with the reference magnetic heading. Notice that magnetic field measurements are used only to determine heading—not pitch and roll. This approach also assumes (and requires) a near level orientation.

Here in the present invention, however, the magnetic measurements are used to determine not only heading, but pitch and roll as well. This resolves the issue of acceleration disturbances in a dynamic motion environment. It also resolves the unobservability problem associated with ballistic (or free-fall) motion. This results in a much more robust and accurate system.

Looking to the processes running on microprocessor 102, we see that user interface 104 enables interfacing with a mode control process 112. Mode control process 112 receives information from interface 104 and then enables the initiation of several process components running on processor 102.

Control process 112 may be used to initiate a navigation attitude solution process 114. Once this initialization is complete, control process 114 updates navigation (position and velocity states), as well as heading, pitch, and roll states. This is done by: compensating gyro and accelerometer output; transforming this output to the navigation frame of reference through Euler angles, quaternions, and direction cosine matrices; and integrating the states (i.e. solving a differential equation). Output from navigation attitude solution process 114 to a system user is accomplished using an output module 116. Output from this process is also sent to and used in other processes (e.g., an intermittent gyro calibration process 120 and a magnetometer calibration process 124).

Output modules like module 116 are known in the art, and are capable of delivering values for translational acceleration, velocity, positional, angular acceleration, angular velocity, attitude and other derived values so that they can be displayed to a local or remote user in real time.

An accelerometer compensation process 118 continually receives a body-sensed raw acceleration readings from the accelerometers 106 in a manner which will be known to those skilled in the art. This compensation process involves the use of acceleration calibration coefficients. These acceleration calibration coefficients, which are determined in the lab by the manufacturer, compensate for known bias and other errors (e.g., scale factors) which cause inaccurate accelerometer measurements.

Another means to bring the compensated value for acceleration closer to true is by estimation using a Kalman filtering process 132. The Kalman filtering process 132 generates corrected acceleration biases ($\delta a$) which will be used to further refine the compensated acceleration values. Once compensated values have been reached for acceleration, they are used by both the navigation and attitude solution module 114 to generate outputs in a manner known to those in the art. The compensated acceleration values are also used by the intermittent gyro calibration process 122 (which will be discussed in more detail below) to help calibrate gyro information received.

Data including the original body-sensed raw angular rate readings is received by a gyro compensation process 122. Process 122 adjusts this data according to manufacturer/lab-provided calibration coefficients which strive to account for biases, alignment errors, scale factors and other things which corrupt sensor parameters so that the gyro readings are near true values. This is all standard with most inertial/magnetic measurement devices. Gyro compensation module 122 then transmits compensated angular rate values to the navigation and attitude solution module 114. Once the process begins, the calibration coefficients are continually adjusted by Kalman filtering to maintain the compensated angular rate values close to true and filter errors. This is done using Kalman filter corrected values for gyro bias ($\delta \omega$) and for gyro scale factor ($\omega \delta_{SF}$). See FIG. 1. Finally, compensation process 122 interfaces with intermittent calibration process 120.

Figure 2:
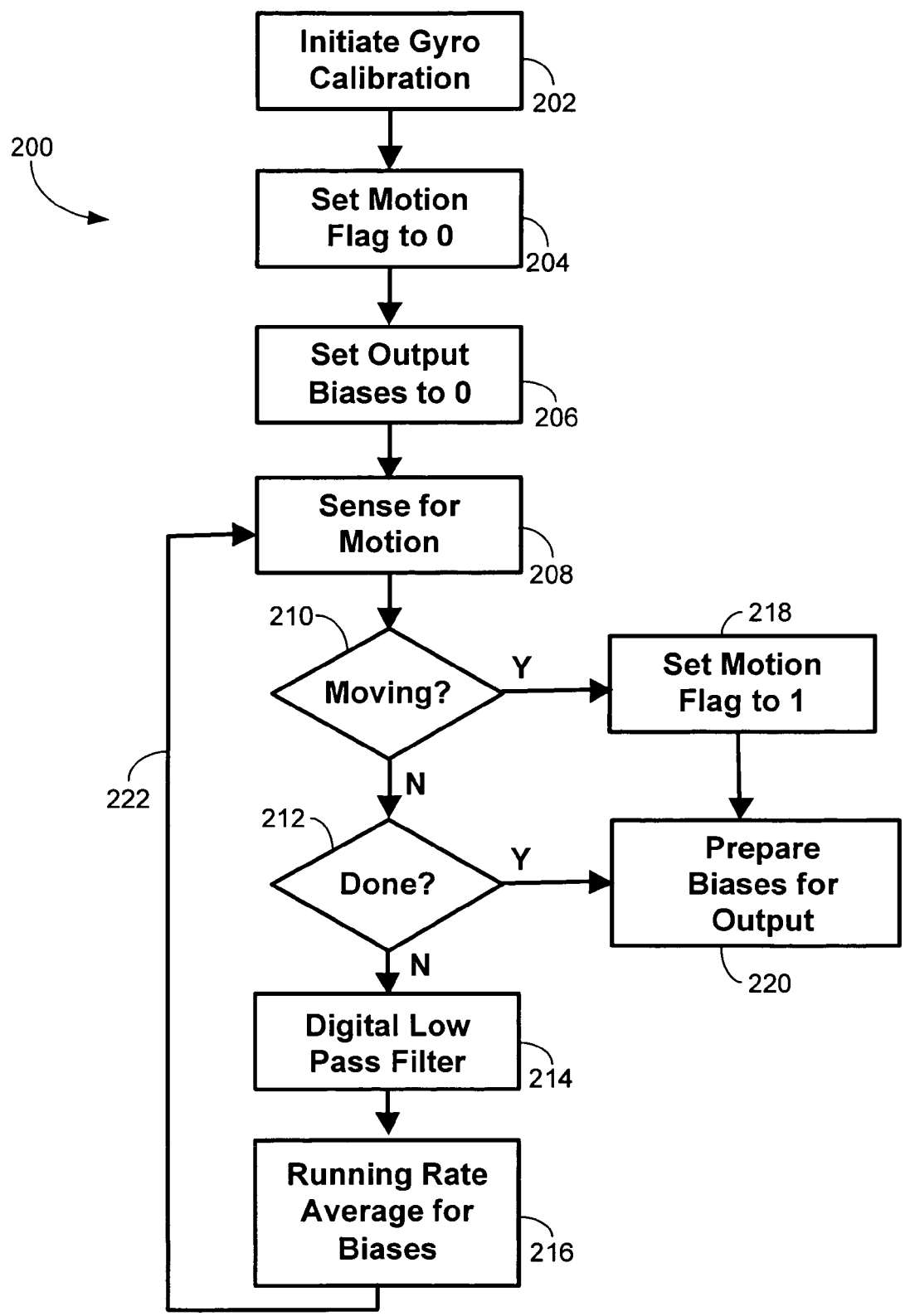
FIG. 2 is a process flow diagram showing the steps in an intermittent-gyro-calibration process module of an embodiment of the present invention.

FIG. 2 shows a process diagram 200 which discloses the intermittent gyro calibration process 120 in more detail. Referring to the figure, we see that the process begins in a step 202 in which it receives an activation signal from user interface 104. This might occur, when a user activates it by pushing a particular button. This process might also be activated through an onboard detection of a "still environment".

This activation signal initiates the gyro calibration process in a step 202.

Once activation has occurred, a motion flag in the process will initially be set to "0" as shown in a step 204. This flag will later be changed to a "1" if the body is in motion. These binary identifiers will indicate to the gyro calibration process 120 whether the body is in motion or not.

Next, in a step 206, output biases will be zeroed out (set to "0") for the purpose of creating a starting point, thus initializing the bias values. Thus, if the calibration is unsuccessful for some reason (e.g., motion is detected) no bias estimates will ultimately be reported by the FIG. 2 process.

In a next step 208, the process senses for motion of the body. This is done by monitoring the onboard compensated acceleration from process 118 and also the compensated angular rate from step 122. If no translational or rotational accelerations are detected, then the answer to a next query step 210 will be "no."

Given a no answer to step 210, the process proceeds to a step 212. In this step an inquiry is made as to whether the user has indicated an end to gyro calibration process 120. The user indicates a desire to terminate by using the pushbutton (or other user interface arrangement) 104 which causes mode control 112 to transmit a disable signal which will cause intermittent gyro calibration process 120 to terminate. If a disable signal has not yet been transmitted, the answer at query step 212 will be "no." This causes the process to proceed on to step 214.

In step 214, a digital low pass filter is used to attenuate the gyro rate data by suppressing high frequency noise.

Once the data has been filtered, the process continues on to a step 216 where running rate averages are updated for the bias estimations. These averages are then stored, and the process will continue in a continuous loop 222 through steps 208, 210, 212, 214, and 216 until a "yes" answer is given in either of steps 210 or 212. This results in the stored averages for the biases being continually updated which will result in more accuracy over time.

The intermittent gyro process 120 of FIG. 1 can come to a conclusion in two ways. One way is if either linear acceleration or rotational rates are detected. These indications of body motion will cause the answer to query step 210 to be "yes." If yes is the answer, and thus, the body is in angular or translational motion, the process then proceeds in a step 218 the motion flag is set to "1."

Then, in a step 220, the process outputs the averaged bias data on to the compensation process. The output includes onboard estimates of the gyro biases along with the motion flag information (the "1" indicates to that compensation process that the body is in motion). This indicates to gyro compensation process 122 that the intermittent calibration process has terminated because the body is in motion.

The second way the FIG. 2 process can end is if the user disables it. Again, this is done using a control button. When this occurs, the answer to the step 212 query will be "yes" and the process then proceeds to step 220 where biases for output are prepared and then transmitted to gyro compensation process 122. An indication that the body is still at rest will also be presented to process 122 in that the motion flag will still be at "0."

Though the FIG. 2 intermittent gyro calibration process is shown in FIG. 1 as working in cooperation with the other processes disclosed, it should be noted that it is not required that it be combined with all these other processes in order to be useful or operational. One skilled in the art will recognize that this process could also be used separately from numerous other FIG. 1 processes and its inclusion in combination should not limit the scope of the present invention to the combination shown.

To further assist the gyro and accelerometer supporting processes, a plurality of other processes are provided which use information received from the AMR sensors and manipulate it to further the objectives of the rest of the system. These processes include a magnetometer calibration process 124, a navigation frame initialization process 126, a magnetic anomaly filter process 128, a magnetometer compensation process 130, a magnetic aiding Kalman filter process 132, and a magnetic aiding prefilter process 134.

As can be seen from FIG. 1, the body sensed raw data is used by two different modules. First it is received by magnetometer calibration module 124. This process calibrates the magnetic data for system level bias errors. This is done by making a 360 degree rotation in the horizontal plane and a successive 180 degree sweep in the vertical plane. These rotations will allow for observability of the hard core magnetic bias errors in all three axes. The process then outputs onboard calibrated magnetic biases.

These biases, as well as raw magnetic data from 110 and magnetic anomaly estimates from 128 are received into the magnetometer compensation module 125 so that it is able to create a body sensed compensated magnetic field components in a manner known in the art. These components will later, however, be used by the magnetic aiding prefilter 134 process in a novel manner which will be discussed in greater detail below.

This process is what is used to provide the initial three-dimensional coordinate frame of reference to which the sensed magnetic field be transformed. These axis orientations will later be used as a reference point to compare new body-sensed coordinate values to. Changes in orientation from these initial values will be calculated using Euler angles. Because the earth's magnetic field information is a constant over a wide geographical region, this initialization process eliminates the need for an initial reference frame prior to movement. It also eliminates the need for an Earth magnetic field map or model requiring user position (e.g., latitude and longitude). The reference coordinates will, instead, be the coordinates for the navigation and attitude solution when the initialization process occurs.

Figure 3:
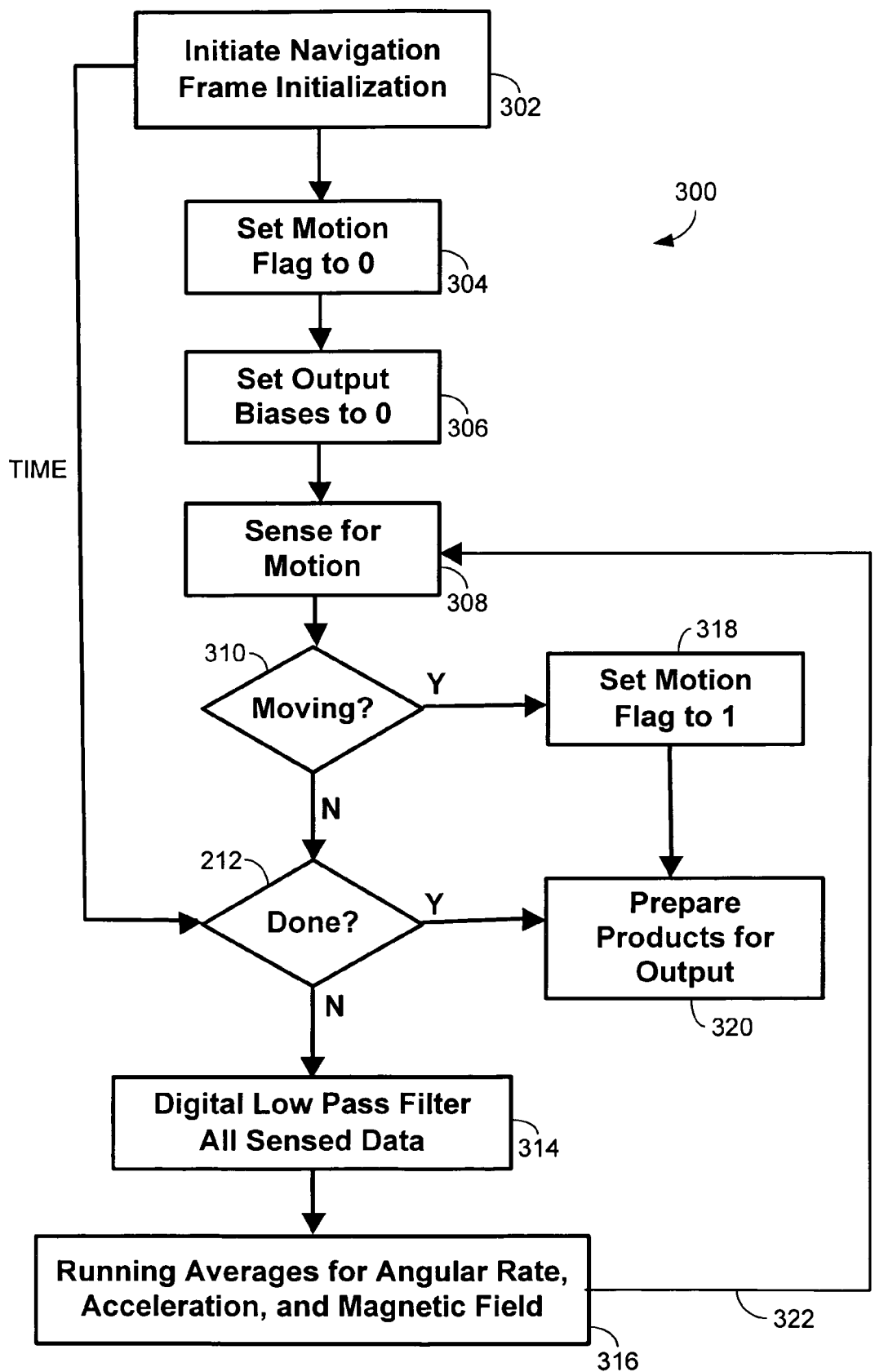
FIG. 3 is a process flow diagram showing the steps in a navigational-frame-initialization process module of an embodiment of the present invention.

The details regarding navigation frame initialization process 126 (referring to FIG. 1) are shown in a process diagram 300 shown in FIG. 3. Process 126 begins in a first step 302 when an enable signal is received. This will, in the preferred embodiment, come as the result of a user pressing an appropriate control button on user interface 104. Once this occurs, module 126 will receive calibrated magnetic data from magnetometer calibration component 124. These calibrated magnetic component values will be recorded as reference coordinates—creating a coordinate frame to which any future movement can be made relative to.

In prior art processes, the magnetic reference component values were downloaded. This required knowledge of initial position and orientation. But here, because of process 126, this preliminary information is not necessary due to utilization of a frame of reference derived in real-time from accelerometer and magnetometer measurements. This makes the inertial/magnetic measurement device of the present invention ideal for on-the-fly usage in bodies for which are in use in the field and thus, do not lend themselves to any particular starting orientation or position. For example, if the body to which the device is a firearm, it would not be necessary to know the initial location and orientation because once the user presses the initialization control button, the navigation frame initialization process 126 begins and a reference frame is created based on acceleration and magnetic data (which is determined relatively to the direction of gravity) and from which initial Euler angles (pitch and roll) may be calculated.

Referring to the FIG. 3 flow chart, in a step 304, a motion flag is set to "0." This flag will later be changed to a "1" if the body is in motion.

Next, in a step 306, the output biases will be zeroed out (set to "0"). By initializing these biases at zero, the FIG. 3 process prevents any prior recorded values from interfering with the accuracy of the process. Especially in situations where motion is detected and thus, the FIG. 3 process will be terminated before running averages are taken (as will be discussed below).

In the next step 308, the process senses the motion of the body. This is done by monitoring the onboard compensated acceleration from process 118 and also the compensated angular rate from step 122. If no translational accelerations or rotational rates are detected, then the answer to a next query step 310 will be "no" and the process will move on to a step 312.

In step 312 an inquiry is made as to whether the user has indicated an end to the navigational frame initialization process. The process is timed. The answer to query step 312 will depend on whether this time has yet elapsed. If not, then the answer to step 312 will be "no." This causes the process to proceed on to step 314.

In step 314, a digital low pass filter is used to eliminate high frequency noise from all sensed data.

Once the data has been filtered, the process continues on to step 316 where running averages are taken for angular rate, acceleration, and the magnetic field. These averages are repeatedly stored as the process transpires in a continuous loop 322 through steps 308, 310, 312, 314, and 316. This will occur until a "yes" answer is given in either of steps 310 or 312. This results in the stored averages being continually updated until the process ends.

The navigation frame initialization process 126 which is shown in detail in FIG. 3 can end in one of two ways. The first way is if either translational accelerations or rotational rates are detected in step 308. These indications of body motion will cause the answer to query step 310 to be "yes." If yes is the answer, and thus, the body is in angular or translational motion, the process then proceeds in a step 318 the motion flag is set to "1."

Then, in a step 320, the process outputs the averaged data (including gyro bias) which is continually saved in step 316 and passes it on to the navigation and attitude solution process 114. The information transmitted includes: (i) an initial onboard estimate of gyro biases, (ii) an onboard estimate of initial pitch, roll, and heading, and (iii) the initial magnetic field reference data (e.g., initial gyro bias, initial Euler angles, reference magnitude information). The information also includes the motion flag information (the "1" indicates that the process has terminated because the body is in motion, whereas a "0" would have indicated that the process timed out). Should the returned value of this flag be "1", the process will need to be retried.

The second way the FIG. 3 process can end is if the user disables it. This will be recognized in query step 312. The answer in step 312 will be "yes" if a predesignated amount of time has expired. If this has occurred, the process then proceeds to step 320 where the running averages (initial onboard estimate of gyro biases, pitch, roll, and heading, and the initial magnetic field reference data) saved in step 316 are conveyed to navigation and attitude solution process 114. Also conveyed is that the motion flag is still at "0" indicating that the body is still at rest. The biases for output are prepared and then transmitted to gyro compensation process 122.

Though the FIG. 3 navigation frame initialization process is shown in FIG. 1 as working in cooperation with the other processes disclosed, it should be noted that it is not required that it be combined with all these other processes in order to be useful or operational. One skilled in the art will recognize that this process could also be used for navigational frame initialization purposes separately from numerous other FIG. 1 processes. Its inclusion in combination should not limit the scope of the present invention to any combination shown as it is severable and useable with other motion and/or direction detecting methods which depend on magnetic data.

The earth's magnetic field is typically constant within a limited geographical area and, therefore, normally a good reference. But in reality, local magnetic anomalies can create variation. When the inertial/magnetic measurement device of the present invention is mounted on a body, a proximate source of magnetic flux will, unless compensated for, cause inaccurate readings. For example, assuming the inertial/magnetic measurement device is mounted on a small firearm, the passing by of a tank may distort the existing magnetic field and also, thus, device readings. The processes of the present invention account for such circumstances.

This is done using a magnetic anomaly filter module 128 which detects changes in magnetic field magnitude and estimates the distortion effects of the anomaly. Though rotation of the body in the uncorrupted magnetic field will cause different magnetic readings in each of the three dimensions, the overall magnetic field magnitude will remain constant. Anomalies, however, will change this magnitude. Thus, the presence of an anomaly will be recognizable by any significant change in magnetic field magnitude. Module 128, when such an anomaly is recognized, will also alert the Kalman Filter module 132 that the magnetometer-sensed data is not reliable at that time.

Figure 4:
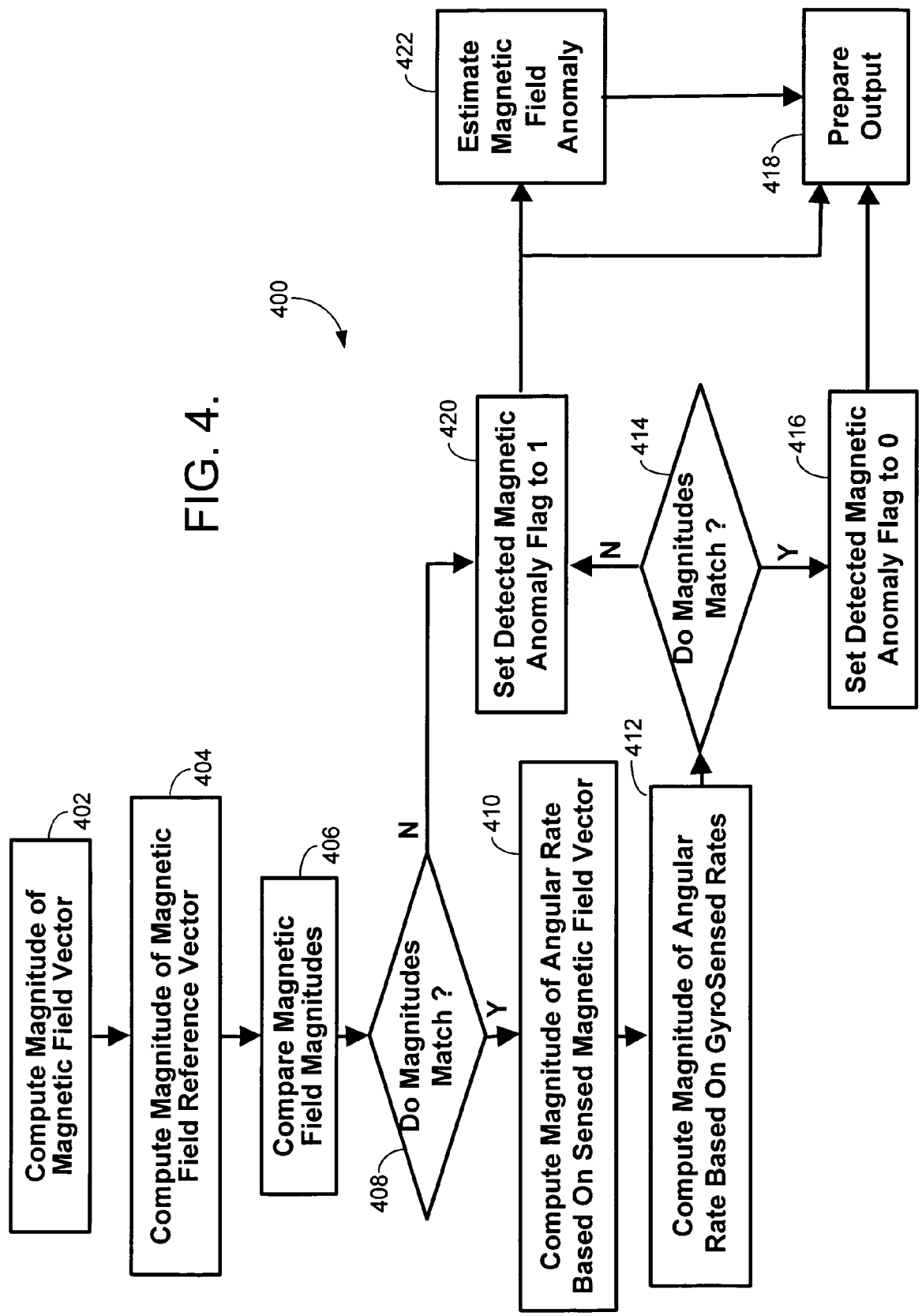
FIG. 4 is a process flow diagram showing the steps in a magnetic-anomaly-filter process module of one embodiment of the present invention.

The details regarding anomaly filter process 128 may be seen in a flow diagram 400 shown in FIG. 4. In a first step 402, the process compensates the body sensed raw magnetic field components derived from the magnetometers with the magnetic biases estimated in block 124 to compute the magnitude of the magnetic field vector.

In a next step 404, the process uses the initial magnetic field reference values which are derived from the FIG. 4 frame initialization process. These values are used to compute the magnitude of the magnetic field reference vector. Under normal circumstances, where no local anomaly exists, the measured magnitude should be nearly equal to the initial magnetic field reference established in step 126 of FIG. 1.

In a next step 406, the process compares the computed magnetic field vector magnitude of step 402 to the computed magnitude of the magnetic field reference vector of step 404. Then, in a query 408, it is determined whether the magnitudes are substantially the same. If so, this is a preliminary indication that the sensed magnetic data is reliable and the process continues on to a step 410. In step 410 the magnitude of the angular rate is calculated based on the current and previous sensed magnetic field vector.

Next, in a step 412, the magnitude of the angular rate is calculated, but in this step the basis for the rates calculated is gyro-sensed. This gyro data is gleaned from the body-sensed compensated angular rate which is available from gyro-compensation module 120.

In a next step 414, the magnetic-field rate vector value (as calculated in step 410) is compared to the gyro-sensed rate vector (as calculated in step 412) and a determination is made as to whether the magnitudes of each are substantially equal (within a given threshold value). If so, this confirms that the magnetic readings are accurate and not subject to anomaly and the process proceeds to a step 416 where a flag is set to "0." This flag will later be used by Kalman filter 132 as an indication that no anomaly exists.

If the magnetic data is subject to some sort of anomaly, this should be picked up in either of query steps 408 or 414. If the magnitude of the measured magnetic field vector (calculated in step 402) does not agree (within a given threshold value) with the magnetic field reference vector (calculated in step 402), a "no" answer to query 408 directs the process to a step 420 in which a flag which is indicative of a detected magnetic anomaly to "1."

Similarly, if the magnitude of the angular rates based on the magnetometer-sensed magnetic field vector computed in step 410 do not substantially match up with the magnitude of the gyro-sensed rates calculated in step 412, the same process is followed to step 420 where the flag is set to "1." Regardless of the route the process takes in order to get to step 420, the "1" flag setting will immediately be output to the Kalman filter process 132 via output step 418 so that that process knows anomaly has been detected and that values received should not be given immediate credibility.

Then in a step 422, an estimate of the magnetic field anomaly is computed. Because the initial reference field is known, anomaly influence is measured by differencing the onboard compensated magnetic field vector with the initial reference field vector. The resultant vector is then sent to step 418 of FIG. 4. These anomaly component values for the magnetic field data will then be transmitted to Magnetometer Compensation 125, which converts the anomaly vector to body frame coordinates and removes it from the current measured magnetic field.

Though the FIG. 4 magnetic anomaly filtration process is shown in FIG. 1 as working in cooperation with the other processes disclosed, it should be noted that it is not required that it be combined with all these other processes in order to be useful or operational. One skilled in the art will recognize that this process could also be used for the detection and filtration of magnetic anomalies in other environs and processes. Thus, the inclusion of the FIG. 4 process in FIG. 1 as process 128 should not limit the scope of the present invention to any combination shown as it is severable and useable with other motion and/or direction detecting methods which make use of magnetic data.

Magnetic aided Kalman filter 132 works in cooperation with navigation and attitude solution 114 and other system components to use models of what has occurred in the past and then uses these past models to determine the accuracy of present readings by the sensors. With respect to its functions in cooperation with solution process 114, Kalman filter 132 receives the body to navigation direction cosine matrix ($T_B^N$), the body-sensed angular rate ($\omega$), and the body sensed acceleration (a), and responds with filter corrections for roll, pitch, and heading ($\delta\phi$, $\delta\theta$, and $\delta\psi$ respectively). These Kalman filter processes will be known to those skilled in the art.

One skilled in the art will recognize that Kalman filter arrangements have been used in the past for the estimation of navigation and attitude solution outputs which are close to actual based propagation and estimation using historical data and current gyro and accelerometer readings. Here, Kalman filter 132 is also used to evaluate and process magnetic data. A novel magnetic aiding prefilter 134 is provided to enable operation of this custom Kalman filter.

Referring back to FIG. 1, magnetic aiding prefilter 134 receives: (i) the body sensed compensated magnetic field data from magnetometer compensation process 125, (ii) the body-to-navigation frame transformation matrix values, and (iii) the initial magnetic field in the navigation frame from the navigation and attitude solution module 114, and manipulates these three inputs to aid Kalman filter 132 with magnetic information for modeling purposes. This helps to improve attitude error estimates and gyro bias error estimates.

The specifics regarding operation of the magnetic aiding prefilter 134 are illustrated in a process flow diagram 500 which is shown in FIG. 5. In a first step 502 the process computes the sensed navigational frame magnetic field components. This is done using: (i) the onboard estimate of body to navigational transformation matrix from 114 of FIG. 1 and (ii) the body-sensed compensated magnetic field components from 125 of FIG. 1. The magnetic field in the navigational frame is computed by multiplying the onboard estimate for the body to navigation transformation matrix by the body-sensed compensated magnetic field vector.

Once the body-sensed magnetic field has been transformed to the navigation frame, the process moves on to step 504 where attitude residuals (also called innovations) are calculated. To do this, the process performs a vector cross product operation of the initial magnetic field reference (from navigational frame initialization process 300 from the navigation and attitude solution module 114) and the current measured magnetic field vector computed in step 502. The cross product of these two vectors has a strong correlation to the three-dimensional attitude error vector. These residuals (innovations) are then prepared for, and output to be used in Kalman filter process 132 in a step 506.

Next, in a step 508, a measure of observability for each attitude axis (roll, pitch, yaw) is generated as a function of the angle between the magnetic field vector and each body axis. The angle is calculated by utilizing the vector dot product of each body axis with the vector composed of the initial reference magnetic field. Thus, it is the scalar angle between the reference magnetic field vector and the given axis. The observability is maximized when this angle is 90°. The observability calculated is indicative of how well magnetically sensed attitude errors are being recognized.

Now that the observability has been determined for each rotational axis, a measurement-noise covariance matrix ("R matrix") is computed by a mapping process in a step 510. To do this, step 510 uses semi-empirical data which is generated through simulations. Such data relates the observability angle just discussed with angle measurement uncertainty. This allows for mapping between the observability angle and the Kalman measurement noise covariance matrix (R matrix) diagonal elements. The R matrix is then, in step 506, output to the Kalman filter, where it is used according to known Kalman processes.

Next, in a step 512, if the axis of poorest observability is below a minimum threshold the process applies alternate methods if the conditions allow: by using accelerometer measurements to pitch and roll estimates if near level; by using magnetic compass algorithm for heading if both pitch and roll observabilities are sufficient. These alternative methods are known in the art (e.g., those used in U.S. Pat. Nos. 6,516,283 and 6,522,992). Another alternative method is described as a numerical search for Euler angles errors that give rise to a match with the sensed magnetic field vector. Either method could be used as an optional alternative way of estimating in the case observability is poor in a particular axis over a certain duration limit.

The alternate estimate process of step 512 may be enabled by using a flagging process much like those already described above. In such a case, a "1" or "0" flag would be passed on after step 510 indicating whether a need exists for the alternate estimations caused by poor observability.

If the alternate estimate application is enabled, the R matrix diagonal elements are adjusted accordingly. This is not done for all the diagonal elements, but instead, only for the ones of the poorest observability. Then, in output step 506, these adjusted measurement noise parameters are prepared for and output to Kalman process 132.

Step 516 provides for selective state suppression of the Kalman filter state estimates associated with very poor measurement observability. Like with alternate estimate step 514, this step functions, or not, in response to a flag (a "1" or "0") received from the process. When the observability is below threshold values for certain parameters, this step simply zeros out the corrections so that they will not be fed back to the Navigation & Attitude Solution (module 114 of FIG. 1) nor to the Accelerometer Compensation (module 118 of FIG. 1) nor to the Gyro Compensation (module 122 of FIG. 1).

Though the FIG. 5 magnetic aiding prefilter process 134 is shown in FIG. 1 as working in cooperation with the other processes disclosed, it should be noted that it is not required that it be combined with all these other processes in order to be useful or operational. One skilled in the art will recognize that this process could also be used in cooperation with Kalman filters in other environments and with other processes. Thus, its inclusion FIG. 1 should not limit the scope of the present invention to any combination shown as it is severable and useable with other motion and/or direction detecting methods which use magnetic data.

As can be seen, the present invention and its equivalents are well-adapted to provide accurate estimates of roll, pitch, and yaw over long durations. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. One or more computer-readable media adapted for use with a computing device which is adapted to execute at least one of direction and motion measurement, said media having computer-usable instructions embodied thereon for performing a method comprising:
    computing body-sensed navigational frame magnetic field vector using sensed magnetic data;
    calculating attitude residuals between a group of body-sensed navigational frame magnetic field components and an initial magnetic reference frame;
    outputting said residuals to a Kalman filter process;
    measuring the observability for an attitude axis for each of roll, pitch, and yaw;
    producing a measurement-noise covariance matrix;
    using said measurement-noise covariance matrix in said Kalman filter process;
    detecting for motion;
    generating said initial magnetic reference frame if no motion is detected;
    taking running averages for magnetic field until a predetermined amount of time has elapsed; and
    outputting said running averages to serve as said initial magnetic field reference frame in said calculating step.

2. One or more computer-readable media adapted for use with a comprising device which is adapted to execute at least one of direction and motion measurement, said media having computer-usable instructions embodied thereon for performing a method comprising:
    computing body-sensed navigational frame magnetic field vector using sensed magnetic data;
    calculating attitude residuals between a group of body-sensed navigational frame magnetic field components and an initial magnetic reference frame;
    outputting said residuals to a Kalman filter process;
    measuring the observability for an attitude axis for each of roll, pitch, and yaw;
    producing a measurement-noise covariance matrix;
    using said measurement-noise covariance matrix in said Kalman filter process; and
    wherein said producing a measurement-noise covariance matrix step comprises:
    using simulation generated empirical data to relate observability with angle measurement uncertainty.

3. The media of claim 2 wherein said using step in said method occurs immediately after said producing step.

4. One or more computer-readable media adapted for use with a computing device which is adapted to execute at least one of direction and motion measurement, said media having computer-usable instructions embodied thereon for performing a method comprising:
    computing body-sensed navigational frame magnetic field vector using sensed magnetic data;
    calculating attitude residuals between a group of body-sensed navigational frame magnetic field components and an initial magnetic reference frame;
    outputting said residuals to a Kalman filter process;
    measuring the observability for an attitude axis for each of roll, pitch, and yaw;
    producing a measurement-noise covariance matrix;
    using said measurement-noise covariance matrix in said Kalman filter process; and
    said method including an intermittent gyro calibration module which assists in the calibration of gyro data, said intermittent gyro calibration module comprising:
    sensing for motion;
    low-pass filtering the gyro data;
    taking running averages for bias estimations if no motion is detected; and
    outputting said running averages for bias estimations to a gyro compensation process.

5. The media of claim 4, said intermittent gyro calibration process comprising:
    monitoring an onboard compensated translational acceleration and a compensated onboard angular rate in detecting motion.

6. The media of claim 4, wherein said intermittent gyro calibration process comprises:
    attenuating said gyro data by suppressing high frequency noise using a low pass filter.

7. The media of claim 4, wherein said intermittent gyro calibration process comprises:
    providing a mechanism which is adapted to enable a user to manually terminate the taking of running averages and to cause these averages to be output to said gyro compensation process.

8. One or more computer-readable media adapted for use with an inertial measurement device, said media having computer-usable instructions embodied thereon for performing a method for of measuring at least one of direction and motion which makes use of magnetometer data, said method incorporating an anomaly filter process, said process comprising:
    identifying whether an anomaly exists in said magnetometer data;
    notifying other processes of the existence of an anomaly if one exists; and submitting said magnetometer data to said other processes as reliable if no anomaly is identified
wherein said identifying process comprises:
computing a first magnitude of a first magnetic field vector which is derived from sensed onboard compensated magnetic field data;
computing a second magnitude of a second magnetic field vector which is derived from initial reference magnetic field data;
comparing said first magnitude to said second magnitude; and
executing said notifying step if said first and second magnitudes are significantly different.

9. The media of claim 8, wherein said identifying process comprises:
computing a third magnitude of a magnetometer-sensed angular rate vector;
computing a fourth magnitude of a gyro-sensed angular rate vector;
comparing said third magnitude to said fourth magnitude; and
executing said notifying step if said third and fourth magnitudes are significantly different.

10. One or more computer-readable media adapted for use with an inertial measurement device, said media having computer-usable instructions embodied thereon for performing a method for of measuring at least one of direction and motion which makes use of magnetometer data, said method incorporating an anomaly filter process, said process comprising:
identifying whether an anomaly exists in said magnetometer data;
notifying other processes of the existence of an anomaly if one exists; and
submitting said magnetometer data to said other processes as reliable if no anomaly is identified
wherein said identifying process comprises:
computing a first magnitude of a magnetometer-sensed angular rate vector;
computing a second magnitude of a gyro-sensed angular rate vector;
comparing said first magnitude to said second magnitude; and
executing said notifying step if said first and second magnitudes are significantly different.

11. One or more computer-readable media adapted for use with an inertial measurement device, said media having computer-usable instructions embodied thereon for performing a method for of measuring at least one of direction and motion which makes use of magnetometer data, said method incorporating an anomaly filter process, said process comprising:
identifying whether an anomaly exists in said magnetometer data;
notifying other processes of the existence of an anomaly if one exists; and
submitting said magnetometer data to said other processes as reliable if no anomaly is identified
wherein said process comprises:
estimating said anomaly;
filtering out said anomaly if said notifying step has occurred; and
outputting filtered values to at least one other process for the purpose of estimating at least one of position and motion.

12. The media of claim 11, wherein said process comprises:
taking the difference between an sensed onboard compensated magnetic field vector and an initial reference field vector to create a resultant vector to accomplish said estimating step; and
transmitting said resultant vector to a magnetometer compensation module for the purpose of removing the anomaly.

13. One or more computer-readable media having computer-usable instructions embodied thereon for performing when executed by a computing device a method comprising:
receiving magnetic data including a plurality of simultaneously body-sensed measurements from a plurality of differently-oriented magnetic-sensing devices mounted on a body;
using said magnetic data in calculating a magnetic-reading-based three-dimensional orientation for said body in relation to a known magnetic field.

14. The media of claim 13 wherein said calculating step comprises:
determining a cross product of (i) a first vector comprising a magnetic reference frame for said known magnetic field; and (ii) a second vector derived from said body-sensed measurements;
determining a dot product of a norm of the first vector with the norm of the second vector; and
dividing said cross product by said dot product to determine the attitude innovations for use in a Kalman filter in determining an attitude axis for each of roll, pitch, and yaw enabling said calculation of said magnetic-reading-based three-dimensional orientation.

15. The media of claim 14, said method comprising:
producing a measurement-noise covariance matrix using simulation generated empirical data to relate observability with angle measurement uncertainty.

16. The media of claim 13, said method comprising:
using a magnetic field of the earth to serve as said known magnetic field.

17. The media of claim 16 wherein said calculating step comprises:
determining a cross product of (i) a first vector comprising a magnetic reference frame for said known magnetic field; and (ii) a second vector derived from said body-sensed measurements;
determining a dot product of a norm of the first vector with the norm of the second vector; and
dividing said cross product by said dot product to determine the attitude innovations for use in a Kalman filter in determining an attitude axis for each of roll, pitch, and yaw enabling said calculation of said magnetic-reading-based three-dimensional orientation.

18. The media of claim 17, said method comprising:
producing a measurement-noise covariance matrix using simulation generated empirical data to relate observability with angle measurement uncertainty.

19. A process for measuring at least one of direction and motion, said process comprising:
computing body-sensed navigational frame magnetic field vector using sensed magnetic data from a plurality of magnatometers;
calculating attitude residuals between a group of body-sensed navigational frame magnetic field components and an initial magnetic reference frame using one or more computing devices;
outputting said residuals to a Kalman filter process module on said one or more computing devices;

measuring the observability for an attitude axis for each of roll, pitch, and yaw;

producing a measurement-noise covariance matrix using said one or more computing devices;

using said measurement-noise covariance matrix in said Kalman filter process module;

detecting for motion;

generating said initial magnetic reference frame if no motion is detected using said one or more computing devices;

taking running averages for magnetic field until a predetermined amount of time has elapsed using said one or more computing devices; and outputting said running averages to serve as said initial magnetic field reference frame in said calculating step one said one or more computing devices.

20. An inertial measurement unit comprising:

a computer processing device, said computer processing device adapted to receive magnetic data including a plurality of simultaneously body-sensed measurements from a plurality of differently-oriented magnetic-sensing devices mounted on a body; and said computing device adapted to calculate a magnetic-reading-based three-dimensional orientation for said body in relation to a known magnetic field using said magnetic data.

21. The inertial measurement unit of claim 20 wherein said computer processing device includes a module for determining a cross product of (i) a first vector comprising a magnetic reference frame for said known magnetic field; and (ii) a second vector derived from said body-sensed measurements;

determining a dot product of a norm of the first vector with the norm of the second vector; and dividing said cross product by said dot product to determine the attitude innovations for use in a Kalman filter in determining an attitude axis for each of roll, pitch, and yaw enabling said calculation of said magnetic-reading-based three-dimensional orientation.

22. The inertial measurement unit of claim 21 wherein said module includes a process for producing a measurement-noise covariance matrix using simulation generated empirical data to relate observability with angle measurement uncertainty.

23. The inertial measurement unit of claim 20 wherein said computer processing device includes a process adapted to use a magnetic field of the earth to serve as said known magnetic field.

24. The inertial measurement unit of claim 23 including a calculation module which:

determines a cross product of (i) a first vector comprising a magnetic reference frame for said known magnetic field; and (ii) a second vector derived from said body-sensed measurements;

determines a dot product of a norm of the first vector with the norm of the second vector; and divides said cross product by said dot product to determine the attitude innovations for use in a Kalman filter in determining an attitude axis for each of roll, pitch, and yaw enabling said calculation of said magnetic-reading-based three-dimensional orientation.

25. The inertial measurement device of claim 24 wherein said calculation module comprises a process for producing a measurement-noise covariance matrix using simulation generated empirical data to relate observability with angle measurement uncertainty.

* * * * *